United States Patent
Murakami (10) Patent No.: US 6,414,941 B1
(45) Date of Patent: Jul. 2, 2002

(54) RING NETWORK SUPERVISORY SYSTEM

(75) Inventor: Katsumi Murakami, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/294,328

(22) Filed: Apr. 20, 1999

(30) Foreign Application Priority Data

Apr. 27, 1998 (JP) .......................................... 10-117178

(51) Int. Cl.[7] .............................................. H04L 11/00
(52) U.S. Cl. ...................................... 370/245; 370/452
(58) Field of Search ................................ 370/216, 221, 370/222, 229, 230, 235, 241, 242, 245, 252, 253, 257, 258, 392, 449, 450, 451, 452, 453, 455, 457

(56) References Cited

U.S. PATENT DOCUMENTS

| | | | | |
|---|---|---|---|---|
| 4,567,590 A | * | 1/1986 | Bederman | 370/452 |
| 4,887,256 A | * | 12/1989 | Nakayashiki et al. | 370/245 |
| 5,274,637 A | * | 12/1993 | Sakamura et al. | 370/452 |
| 5,404,134 A | * | 4/1995 | Jinzaki et al. | 340/825.05 |
| 5,598,414 A | * | 1/1997 | Walser et al. | 370/455 |
| 5,651,000 A | * | 7/1997 | Lee et al. | 370/258 |
| 5,657,315 A | * | 8/1997 | Waclawsky et al. | 370/452 |

FOREIGN PATENT DOCUMENTS

| | | |
|---|---|---|
| JP | 3-145239 | 6/1991 |
| JP | 09/294328 | 4/1999 |
| JP | 09/305280 | 5/1999 |

* cited by examiner

*Primary Examiner*—Ricky Ngo
(74) *Attorney, Agent, or Firm*—Oblon, Spivak, McClelland, Maier & Neustadt, P.C.

(57) ABSTRACT

A communication frame has a counter value which is updated each time the communication frame passes through a node, and a source address. Therefore, upon receiving the communication frame, the node references a source address to check to see if the communication frame was generated by the node, that is, if the communication frame is a returned frame. In addition, even when the node finds that the received communication frame is not the communication frame generated by this node, the node checks counter value information in the communication frame to check to see if the communication frame has already circulated around the network, that is, if the communication frame is abnormal. Furthermore, because the counter value information is provided in each communication frame, the present invention is compatible with a system where a plurality of communication frames are on a network at the same time.

11 Claims, 5 Drawing Sheets

RING NETWORK SUPERVISORY SYSTEM

BACKGROUND OF THE INVENTION

1. Field of the Invention

The present invention relates to a ring network supervisory system supervising the communication status of a ring network in which a plurality of nodes are interconnected in a ring so that data may be exchanged with each other via a ring-form transmission line, and more particularly to a simply-structured ring network supervisory system capable of detecting an abnormal frame which cannot be transmitted and of immediately recovering the detected abnormal frame.

2. Description of the Related Art

Conventionally, a ring network in which a plurality of nodes are interconnected in a ring so that data may be exchanged with each other via a ring-form transmission line is known. Also known is a ring network supervisory system, such as the one disclosed in Japanese Patent Laid-Open Application No. Hei 3-145239, which has a counter field in a token frame so that the values may be added.

The token ring supervisory method disclosed in the above patent publication provides, in a token frame which circulates around the ring, the counter field which is used for adding values. Each node comprises receiving means for receiving a frame from the predecessor on the transmission line, transmitting means for transmitting a frame to the successor on the transmission line, counter holding means for holding the value of the counter field in a token frame passing through the node, and frame processing means having a received-frame processing function processing the received frame.

According to this token ring supervisory system, each time a node receives a token ring, the node stores, and then adds "1" to, the value of the counter field of the received frame. In addition, when the node receives a token frame, it calculates the difference between the previously-stored counter field value and the current counter field and checks if the calculated difference is equal to the total number of nodes in the token ring. If the communication functions of all nodes in the ring are normal, the calculated difference should be equal to the total number of nodes; if the communication function of a node in the token ring is abnormal, the calculated difference should not be equal to the total number of nodes.

Therefore, whether or not the communication functions of all nodes in the token ring are normal may be diagnosed by checking if the calculated difference is equal to the total number of nodes. If, as a result of this diagnosis, the communication function of a node in the token ring is found abnormal, the failed node with the abnormal communication function is isolated by sequentially comparing the stored values of each two neighboring nodes.

However, if the conventional token ring supervisory method described above is used in a ring network composed of a plurality of nodes, among which data may be exchanged with each other, connected by a ring-form transmission line which allows a communication frame to be circulated in one direction and, in addition, a plurality of communication frames to be transmitted at the same time, each node requires a plurality of memories, each for storing the value of a counter corresponding to each of a plurality of communication frames, as well as a plurality of frame control circuits. This increases and the size of, and complicates the configuration of, the supervisory circuit installed in each node.

Thus, there has been a long felt need, among those skilled in the art, for the development of a new technology of building a simply-structured system, capable of detecting and then immediately recovering an abnormal frame which cannot be transmitted normally even in a ring network described above.

SUMMARY OF THE INVENTION

In view of the foregoing, it is an object of the present invention to provide a simply-structured ring network supervisory system capable of detecting and then immediately recovering an abnormal frame which cannot be transmitted normally, even when the system is used in a ring network composed of a plurality of nodes, among which data may be exchanged with each other, connected via a ring-form transmission line which allows a communication frame to be circulated in one direction and, in addition, a plurality of communication frames to be transmitted at the same time.

To achieve the above object, there is provided a ring network supervisory system supervising a communication status of a ring network to which a plurality of nodes are connected via a ring-form transmission line for exchanging data, the transmission line allowing a communication frame to be circulated in one direction and, in addition, a plurality of communication frames to be on the transmission line at the same time, the communication frame comprising: a source address description area in which a source address of a source node of the communication frame is described; and a passage counter description area in which a passage counter count value representing a passage count is described, the passage count being incremented each time the communication frame passes through each of the plurality of nodes, each of the plurality of nodes comprising: frame reception means for receiving the communication frame from a neighboring node located in an upstream of the node; local node address storage means for storing a local node address assigned uniquely to the node; one-round checking information storage means for storing one-round checking information referenced to check if the communication frame has circulated around the ring network; frame checking means for referencing a description content of the communication frame received by the frame reception means to check to see if the received communication frame is an occupied frame originated from any of the plurality of nodes or a non-occupied frame not originated from any of the plurality of nodes, the plurality of nodes including the node; address comparison checking means for comparing the source address described in the received communication frame with the local node address stored in the local node address storage means when the frame checking means find that the received communication frame is the occupied frame; passage counter comparison checking means for checking a relation between the passage counter count value described in the received communication frame with the one-round checking information stored in the one-round checking storage means when the address comparison checking means find that the source address and the local node address do not match; passage counter operation means for determining the received frame is normal and for performing a predetermined operation on the passage counter count value described in the passage counter description area in the communication frame when the passage counter comparison checking means find that the relation between the passage counter count value and the one-round checking information do not satisfy a one-round checking condition; abnormal-frame reception signal transmission means for determining that the received communication frame is an abnormal frame and for transmitting an abnormal frame reception signal indicating that the abnormal frame has been received when the passage counter comparison means find that the relation between the passage counter count value and the one-round checking information satisfies the one-round checking condition; frame generation control means for generating the communication frame when the node is the source of the communication frame, the source address description area describing the local node address and the passage counter description area describing the passage counter count value to be used as an initial value, and for generating the communication frame when the node is not the source of the communication frame, the passage counter count description area describing the passage counter count value calculated by the passage counter operation means; and frame transmission means for transmitting the communication frame generated by the frame generation control means to the neighboring node located in a downstream of the node.

According to the present invention, upon receiving a communication frame, the frame checking means first references the description content of the communication frame to check if the received communication frame is an occupied frame which was issued by one of a plurality of nodes including this node or a non-occupied node which is not a frame issued from any of the plurality of nodes.

If it is found, as a result of this frame checking, that the received communication frame is an occupied frame, the address comparison checking means compares the source address described in the received communication frame with the address of the node.

If it is found, as a result of this address comparison, that the source address and the address of this node do not match, the passage counter comparison means checks the relation between the passage counter count value described in the received communication frame and the one-round checking information stored in the one-round checking information storage means.

If it is found, as a result of this passage counter checking, that the relation between the passage counter count value and the one-round checking information does not satisfy the one-round checking condition, then the passage counter operation means judges that the received communication frame is a normal communication frame and performs the predetermined operation on the passage counter count value described in the passage counter count description area of the communication frame. If it is found that the relation between the passage counter count value and the one-round checking information satisfies the one-round checking condition, then the abnormal-frame reception signal transmission means judges that the received communication frame is an abnormal communication frame and sends an abnormal frame reception signal indicating that the abnormal frame has been received.

In addition, when the node is the source of the communication frame, the frame generation control means describes the address of the node in the source address description area and generates a communication frame whose passage counter description area has been changed to the passage counter count value used as the initial value. When the node is not the source of the communication frame, the means generates a communication frame whose passage counter description area has been changed to the count value calculated through the predetermined operation.

Then, the frame transmission means transmits the generated communication frame to the node located in the downstream.

Therefore, the present invention provides a simply-structured ring network supervisory system capable of detecting and then immediately recovering an abnormal frame which cannot be transmitted normally, even when the system is used in a ring network composed of a plurality of nodes, among which data may be exchanged with each other, connected via a ring-form transmission line which allows a communication frame to be circulated in one direction and, in addition, a plurality of communication frames to be transmitted at the same time.

In a preferred embodiment of the present invention, the frame generation control means further comprises a returned-frame regeneration function which, when the address comparison checking means find that the source address and the local node address match, judges that the communication frame originated by the node has returned to the node, discards the received communication frame, and generates a new free token frame which is the non-occupied frame.

In this embodiment, when the address comparison checking means find that the source address and the local node address match as a result of the checking, the frame generation control means judges that the communication frame originated by the node has returned to the node, discards the received communication frame, and generates a new free token frame which is the non-occupied frame.

In a preferred embodiment of the present invention, the frame generation control means further comprises an abnormal frame regeneration function which, when the passage counter comparison means finds that the relation between the passage counter count value and the one-round checking information satisfies the one-round checking condition, judges that the received communication frame is the abnormal frame, discards the received communication frame, and generates a new free token frame which is the non-occupied frame.

In this embodiment, when the passage counter comparison means finds that the relation between the passage counter count value and the one-round checking information satisfies the one-round checking condition, the frame generation control means judges that the received communication frame is the abnormal frame, discards the received communication frame, and generates a new free token frame which is the non-occupied frame. Therefore, even when an abnormal condition occurred on the ring-form transmission line or in any of the nodes, an abnormal frame which is generated due to the abnormal condition and which would circulate around the ring network semi-permanently if left unattended may be returned to the normal state. As a result, a highly-reliable ring network supervisory system protected against abnormal conditions may be implemented.

In a preferred embodiment of the present invention, when the node has data waiting to be transmitted, the frame generation control means generates the communication frame containing the data waiting to be transmitted instead of the new free token frame which is the non-occupied frame.

In this embodiment, when the node has data waiting to be transmitted, the frame generation control means generates the communication frame containing the data waiting to be transmitted instead of the new free token frame which is the non-occupied frame.

This gives a node, which has received a frame generated by itself or an abnormal frame, a chance to transmit a communication frame containing data waiting to be transmitted in the node. Therefore, each node may get transmission rights more often, thereby increasing the throughput of the whole ring network system.

In a preferred embodiment of the present invention, when the frame checking means finds that the received communication frame is the non-occupied frame, the frame generation control means rewrites the passage counter count value of the received communication frame and generates a new communication frame.

In this embodiment, when it is found that the received communication frame is the non-occupied frame as a result of frame checking through the frame checking means, the frame generation control means rewrites the passage counter count value of the received communication frame and generates a new communication frame.

In a preferred embodiment of the present invention, when the passage counter checking indicates that the relation between the passage counter count value and the one-round checking information satisfies the one-round checking condition, the passage counter comparison checking means comprises an abnormal frame reception signal transmission function which judges that the received communication frame is the abnormal frame and transmits an abnormal frame reception signal indicating that the abnormal frame has been received.

In this embodiment, when the passage counter checking indicates that the relation between the passage counter count value and the one-round checking information satisfies the one-round checking condition, the passage counter comparison checking means judges that the received communication frame is the abnormal frame and transmits an abnormal frame reception signal indicating that the abnormal frame has been received.

In a preferred embodiment of the present invention, the ring network supervisory system comprises a plurality of communication supervisory means each connected to one of the plurality of nodes and supervising the communication status of the node, wherein the passage counter comparison checking means transmits the abnormal frame reception signal indicating that the abnormal frame has been received to the communication supervisory means connected to the node to inform the communication supervisory means connected to the node that the abnormal frame has been received.

In this embodiment, because the node receiving an abnormal frame immediately informs the communication supervisory means connected to the node that the abnormal frame has been received, each of the plurality of communication supervisory means can keep track of the abnormal frame generation status in the system.

In a preferred embodiment of the present invention, the predetermined operation performed by the passage counter operation means is to add "1" to the passage counter count value.

In this embodiment, the predetermined operation performed by the passage counter operation means is to add "1" to the passage counter count value.

In a preferred embodiment of the present invention, the predetermined operation performed by the passage counter operation means is to subtract "1" from the passage counter count value.

In this embodiment, the predetermined operation performed by the passage counter operation means is to subtract "1" from the passage counter count value.

To achieve the above object, there is provided a ring network supervisory system supervising a communication status of a ring network to which a plurality of nodes are connected via a ring-form transmission line for exchanging data, the communication frame comprising: a source address description area in which a source address of a source node of the communication frame is described; and a passage counter description area containing a value which is updated each time the communication frame passes through each of the plurality of nodes, each of the plurality of nodes comprising: frame reception means for receiving the communication frame; address comparison means for comparing the source address described in the received communication frame with a local node address; one-round checking means for checking if the received communication frame has circulated around the ring network, based on a counter value stored in the passage counter description area of the received communication frame, when the address comparison means judges that the source address and the local node address do not match; passage counter operation means for judging that the received communication frame is a normal frame and for performing a predetermined operation on the counter value stored in the passage counter description area in the received communication frame to update the counter value when the one-round checking means judges that the received communication frame has not yet made a one-round circulation; abnormal-frame reception signal transmission means for judging that the received communication frame is an abnormal frame and for transmitting a signal indicating that the abnormal frame has been received when the one-round checking means find that the received communication frame has made the one-round circulation; frame generation control means for generating the communication frame when the node is the source of the received communication frame, the source address description area describing the local node address and the passage counter description area describing an initial value, and for generating the communication frame when the node is not the source of the received communication frame, the passage counter description area describing the counter value updated by the passage counter operation means; and frame transmission means for transmitting the communication frame generated by the frame generation control means.

The nature, principle and utility of the invention will become more apparent from the following detailed description when read in conjunction with the accompanying drawings.

DESCRIPTION OF THE PREFERRED EMBODIMENTS

An embodiment of a ring network supervisory system according to the present invention will be described in detail below with reference to the drawings.

Figure 1:
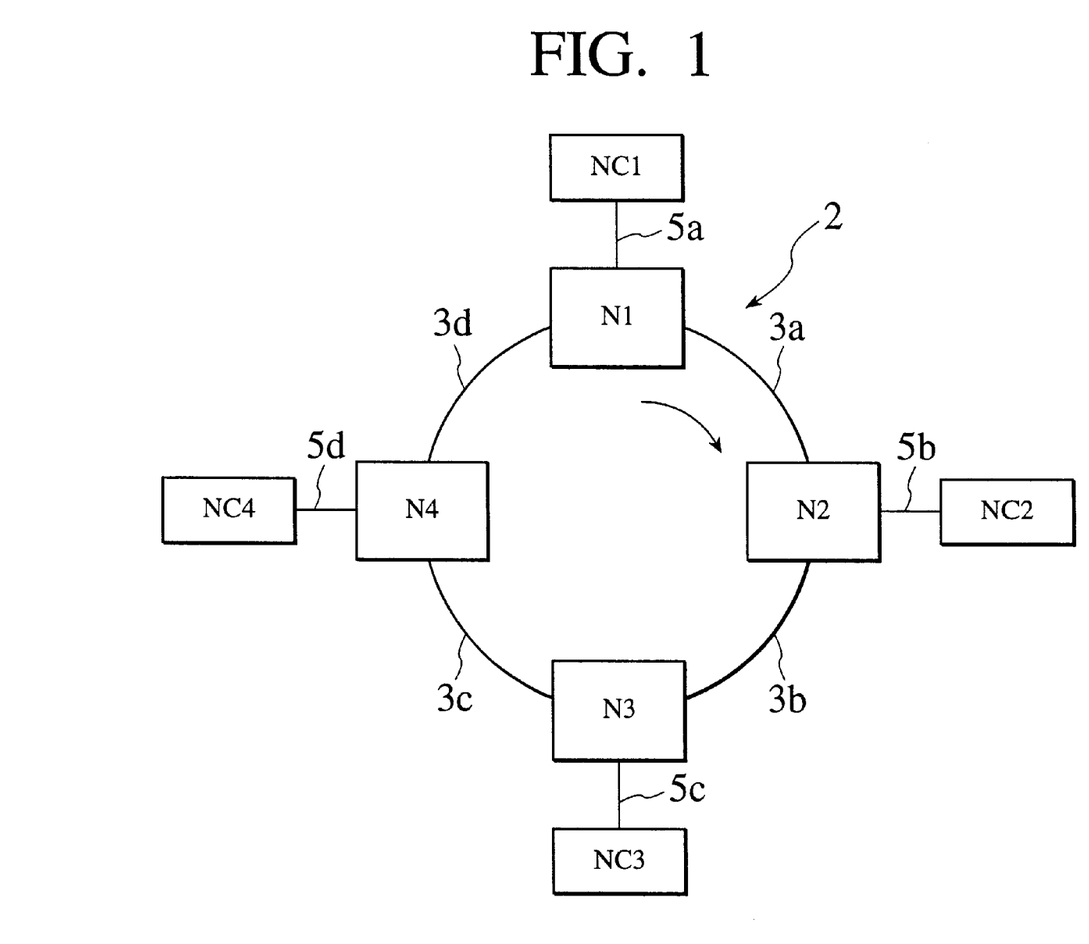
FIG. 1 is a block diagram showing the outline of a ring network supervisory system according to the present invention.

Referring to FIG. 1, a ring network supervisory system 1 according to the present invention has a communication supervisory function which supervises the communication status of a ring network 2 composed of a plurality of nodes, N1, N2, N3, and N4, among which data may be exchanged via a ring-form transmission line 3.

The ring-form transmission line 3 allows a communication frame to be circulated in one direction, for example, in a clockwise direction as shown in FIG. 1. It also allows a plurality of communication frames to be on the ring-form transmission line 3 at the same time.

A plurality of node controllers NC1, NC2, NC3, and NC4 are connected to the plurality of nodes, N1, N2, N3, and N4 via communication lines 5a, 5b, 5c, and 5d, respectively. The node controllers function as communication supervisory means for controlling the operation of the nodes and for supervising the communication status of the nodes, for example, whether or not the nodes receive an abnormal frame.

Each of the plurality of nodes N has one or more functional units, not shown in the figure, connected to allow data to be exchanged between nodes N, between functional units, and between a functional unit and the node N, all via the ring-form transmission line 3.

The functional units described above include the following units when the ring network 2 according to the present invention is applied, for example, to a vehicle. The following functional units may be used as necessary. They include a cellular phone, a facsimile (FAX), a digital TV, radio receiver, a navigation system (NV), a DVD (Digital Video Disc or Digital Versatile Disc)-ROM unit, a CD (Compact Disc)-ROM unit, a DAT (Digital Audio Tape-recorder), an MD (Mini Disc), a digital signal processor (DSP) built-in audio amplifier, a CAN (Controller Area Network) interface, sensors such as a directional sensor or a speed sensor, a monitor, and a personal computer installed in a car.

Figure 3:
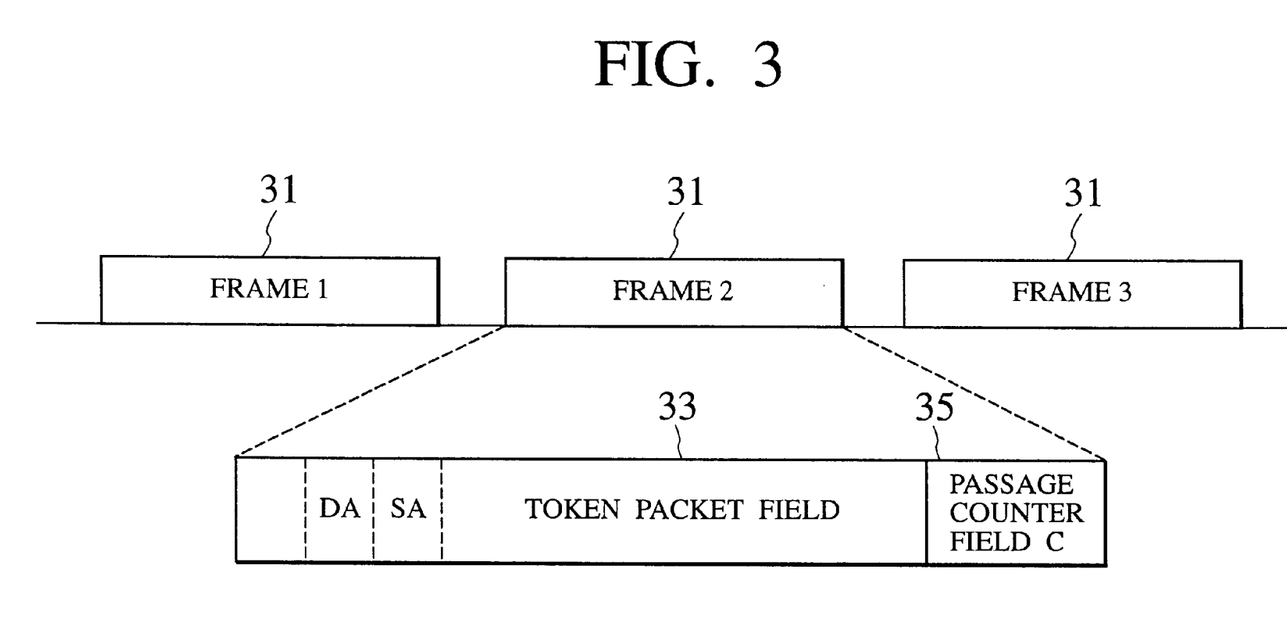
FIG. 3 is a diagram showing an example of the format of a communication frame circulating around the ring network.

Referring to FIG. 3, the format of a communication frame circulating around the ring network 2 will be described. A communication frame 31 consists of a plurality of information description areas where various types of information are described. The two main fields of the plurality of information description areas are a token packet field 33 and a passage counter field 35.

The token packet field 33 comprises three areas: a destination address description area, DA, in which the destination address of the destination node of the communication frame 31 is described, a source address description area, SA, in which the source address of the source node of the communication frame 31 is described, and a data description area in which various types of data, such as instructions, control data, and source data, are described.

The passage counter field 35 has a passage counter description area in which the count of the passage counter representing the number of times the communication frame 31 has passed the plurality of nodes N. When the communication frame 31 passes through each of the plurality of nodes, the node updates and rewrites this area.

Next, referring to FIG. 2, the internal block configuration of each node functioning an important role in the ring network supervisory system 1 will be described with node N1 as an example. Because the internal block configuration is common among the plurality of nodes N, only that of node N1 is described instead of describing the internal block configurations of all nodes.

Figure 2:
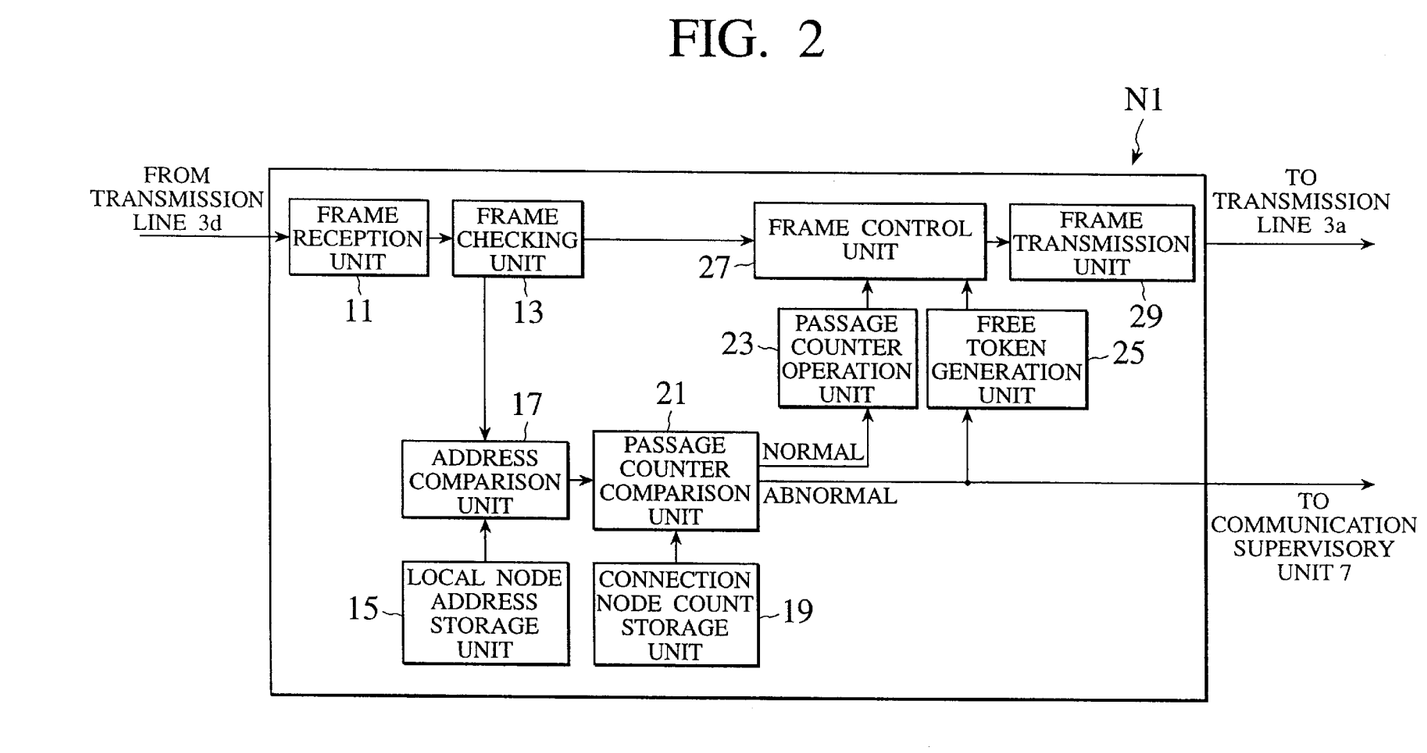
FIG. 2 is a block diagram showing a node which is a main part of the ring network supervisory system according to the present invention.

As shown in FIG. 2, node N1 comprises a frame reception unit 11 which functions as frame reception means, a frame checking unit 13 which functions as frame checking means, a local node address storage unit 15 which functions as local node address storage means, an address comparison unit 17 which functions as address comparison checking means, a connection node count storage unit 19 which functions as one-round circulation checking information storage means, a passage counter comparison unit 21 which functions as passage counter comparison checking means and as abnormal frame reception signal transmission means, a passage counter operation unit 23 which functions as passage counter operation means, a free token generation unit 25 and a frame control unit 27 which function as frame generation control means, and a frame transmission unit 29 which functions as frame transmission means.

The frame reception unit 11 receives the communication frame 31 from node N4 which is located in the upstream.

Upon receiving the communication frame 31 via the frame reception unit 11, the frame checking unit 13 references the description content of the received communication frame 31 to check if it is an occupied frame or a non-occupied frame. The occupied frame is a frame generated by one of the plurality of nodes including the this node. The non-occupied frame is a frame not generated by any of the plurality of nodes.

The local node address storage unit 15 contains the node address uniquely assigned to this node.

When the frame checking unit 13 finds that the received communication frame 31 is an occupied frame, the address comparison unit 17 compares the source address, SA, described in the received communication frame 31 with the address of this node stored in the local node address storage unit 15.

The connection node count storage unit 19 contains one-round circulation information that is referenced to check if the communication frame 31 has made a one-round trip on the ring network 2.

This one-round circulation information is, for example, the "total number of nodes" connected to the ring network 2. In this case, during initialization that is performed each time the ring network 2 is turned on, the total number of nodes stored in the connection node count storage unit 19 is reset and verified. The total number of nodes obtained through this verification is stored as the new total number of nodes. When the total number of nodes is used as the one-round circulation checking information, the initial value of "1" is set in the passage counter field 35 and the passage counter operation unit 23 is set up to add "1" to the passage counter value.

In the case described above, the check is made as follows. If the passage counter value is smaller than the total number of nodes connected to the network, it is judged that the relation between the passage counter value and the one-round checking information does not satisfy the one-round checking condition. On the other hand, if the passage counter value is equal to or larger than the total number of nodes connected to the network, it is judged that the relation between the passage counter value and the one-round checking information satisfies the one-round checking condition.

The value of "0" may also be used as the one-round checking information. When the value of "0" is used as the one-round circulation checking information, the total number of nodes is set in the passage counter field 35 and the passage counter operation unit 23 is set up to subtract "1" from the passage counter value.

In the case described above, the check is made as follows. If the passage counter value is larger than the predetermined value of "0", it is judged that the relation between the passage counter value and the one-round checking information does not satisfy the one-round checking condition. On the other hand, if the passage counter value is equal to or smaller than the predetermined value of "0", it is judged that the relation between the passage counter value and the one-round checking information satisfies the one-round checking condition.

The passage counter comparison unit 21 has two functions: the passage counter comparison checking function and the abnormal frame reception signal transmission function. When the address comparison unit 17 finds that source address, SA, and the address of this node do not match, the passage counter comparison checking function compares the passage counter value described in the received communication frame 31 with the one-round checking information stored in the connection node count storage unit 19. If, as a result of the passage counter comparison checking function, the relation between the passage counter value and the one-round checking information satisfies the one-round checking condition, the abnormal frame reception signal transmission function judges that the received communication frame 31 is an abnormal frame and transmits the abnormal frame reception signal indicating that the abnormal frame has been received.

If the passage counter comparison unit 21 finds that the relation between the passage counter value and the one-round checking information does not satisfy the one-round checking condition, the passage counter operation unit 23 judges that the received communication frame 31 is a normal frame. The passage counter operation unit 23 then performs a predetermined operation on the passage counter value. For example, it adds "1" to, or subtracts "1" from, the passage counter value.

The free token generation unit 25 has two functions: the returned-frame regeneration function and the abnormal frame regeneration function. If the address comparison unit 17 finds that the source address, SA, matches the address of this node, the returned-frame regeneration function discards the received communication frame 31 assuming that the communication frame 31 generated by this node has returned and generates a new free token frame which is a non-occupied frame. If the passage counter comparison unit 21 finds that the relation between the passage counter value and the one-round checking information satisfies the one-round checking condition, the abnormal frame regeneration function discards the received communication frame 31 assuming that it is an abnormal frame and generates a new free token frame which is a non-occupied frame.

The frame control unit 27 performs two operations. That is, when this node is the source of the communication frame 31, the frame control unit 27 generates the communication frame 31 whose source address description area contains the address of this node and whose passage counter field 35 contains the initial value, such as "1" or "total number of nodes", as the passage counter value. When this node is not the source of the communication frame 31, the frame control unit 27 generates the communication frame 31 whose passage counter field 35 contains the passage counter value calculated by the passage counter operation unit 23.

The frame transmission unit 29 transmits the communication frame 31 generated by the frame control unit 27 to node N2 which is in the downstream of this node.

Figure 4:
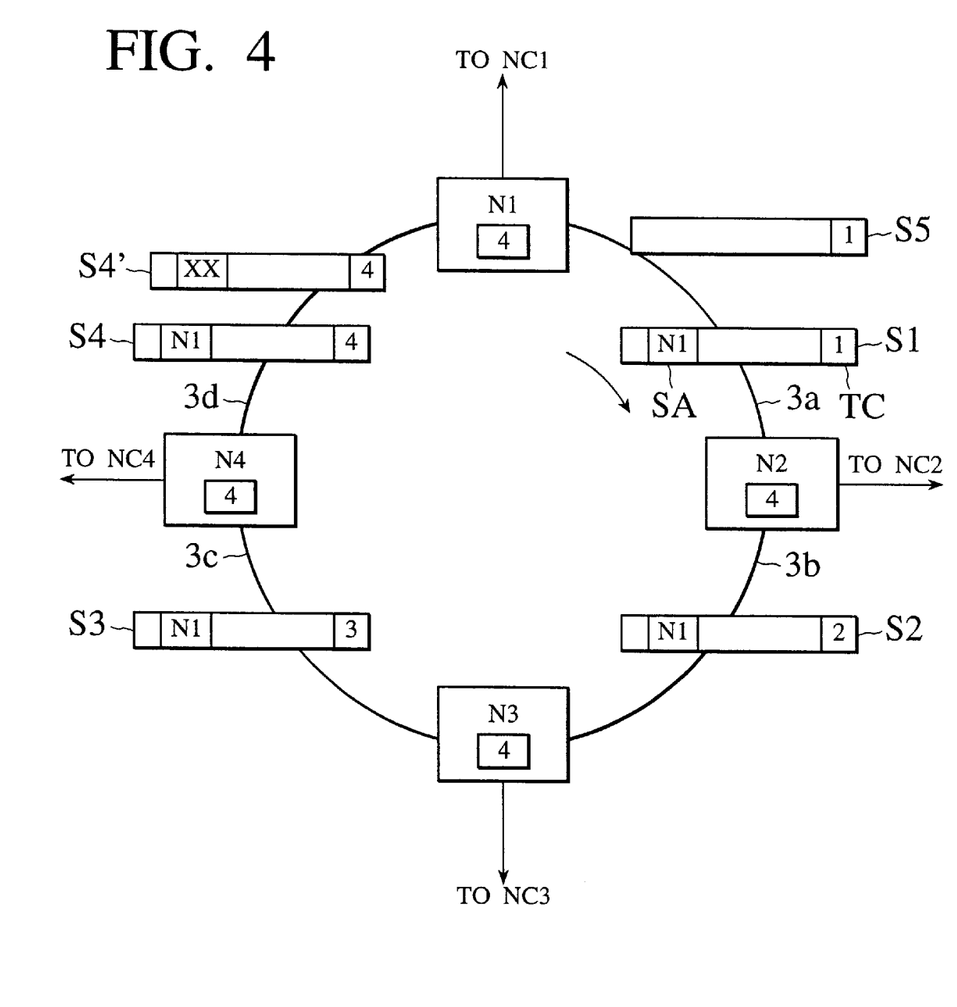
FIG. 4 is a diagram showing the transition of a communication frame circulating around the ring network.

Next, the outline operation of this supervisory system will be described by referring to FIG. 4. In the example shown in this figure, the communication frame 31 is transmitted from the source node, N1, to its downstream nodes in the clockwise direction indicated by the arrow in the block configuration diagram in FIG. 4. In FIG. 4, the number "4" shown in each node N represents the total number of nodes, "N1" shown in the communication frame sequentially circulated around the ring network 2 represents the source address SA, and the number at the end of the communication frame represents the count value C stored in the passage counter.

First, node N1 describes its own node address "N1" in the source address description area, generates the communication frame 31 whose passage counter field 35 contains the passage counter count value C which is set to the initial value of "1", and transmits the generated communication frame 31 to node N2 located in the downstream (step S1).

Upon receiving this communication frame 31 from node N1, node N2 performs the predetermined operation on the count value C of "1" described in the passage counter field 35 of the communication frame 31. That is, N2 adds "1" to the passage counter value, generates the communication frame 31 whose passage counter field 35 has been changed to "2" generated by the addition, and transmits the generated communication frame 31 to node N3 located in the downstream (step S2).

Similarly, nodes N3 and N4 sequentially transmit the communication frame 31, and thus the communication frame 31 returns to the source node N1 (steps 3 and 4).

If the communication frame 31 was transmitted successfully in steps S1 to S4, the source address "N1" described in the communication frame 31 which has returned to N1 matches its own node address of "N1". Therefore, node N1 discards the communication frame 31 assuming that the communication frame 31 originated by node N1 has returned normally. It then performs returned-frame regeneration processing, generating a new free token frame which is a non-occupied frame (step S5).

On the other hand, if the communication frame 31 was not transmitted successfully, for example, if the source address, SA, was changed to "XX" due to an abnormal condition on the ring-form transmission line 3 or in node N4, an abnormal frame is generated. In this case, the source address, XX, included in the returned communication frame 31 does not match the address of node N1 but the relation between the count value C in the passage counter field 35 and the one-round checking information satisfies the one-round checking condition. That is, because the count value C stored in the passage counter field 35 is equal to or larger than the total number of nodes, N1 judges that the communication frame 31 which has returned is an abnormal frame and therefore discards it. Then, N1 performs abnormal frame regeneration processing to generate a new free token frame which is a non-occupied frame (step S4').

And, node N1 transmits the free token frame generated in step S4' to node N2 located in the downstream (step S5).

As described above, the ring network supervisory system according to the present invention, with a simple structure, detects an abnormal frame which cannot be transmitted and, at the same time, immediately recovers the detected abnormal frame.

Figure 5:
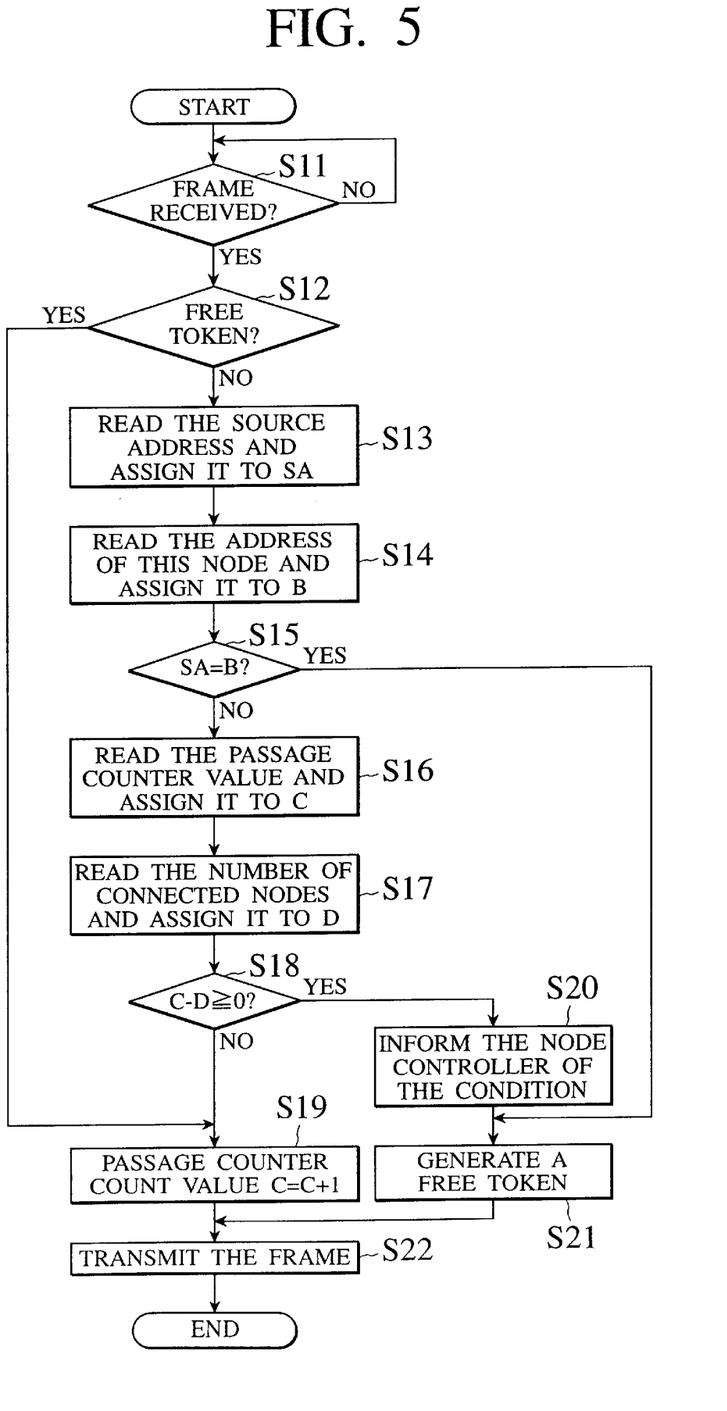
FIG. 5 is a flowchart showing the processing procedure of the ring network supervisory system according to the present invention.

Next, referring to FIG. 5, the internal operation of a node playing an important role in the ring network supervisory system according to present invention will be described in detail.

First, the frame reception unit 11 performs frame reception wait processing to wait for the communication frame 31 to be sent from the node located in its upstream (step S11).

When the frame reception unit 11 receives, in step S1, the communication frame 31 from the node located in the upstream, the frame checking unit 13 references the content, such as the originating address, SA, described in the received communication frame 31. It then checks if the received communication frame 31 is an occupied frame, that is, a frame issued from one of the plurality of nodes N including the node which received the communication frame or if the received communication frame 31 is a non-occupied frame (free token frame), that is, a frame not issued from any of the plurality of nodes N (step S12).

If the received communication frame 31 is found a free token frame that is a non-occupied frame as a result of frame checking in step S12, the frame checking unit 13 performs no processing for the received communication frame 31 and passes it, with no modification, to the frame transmission unit 29 via the frame control unit 27. Upon reception, the frame transmission unit 29 forwards the received communication frame 31 to the node located in the downstream (step S22) to end frame processing.

Instead of the above processing, if the received communication frame 31 is a free token frame which is a non-occupied frame as a result of frame checking in step S12, it is possible to generate the communication frame 31 whose passage counter value has been changed and to forward it to the node located in the downstream.

On the other hand, if the received communication frame 31 is found an occupied frame as a result of frame checking in step S12, the address comparison unit 17 reads the source address, SA, from the received communication frame 31 (step S13), reads the node address, B, of this node from the local node address storage unit 15 (step S14), and compares the source address, SA, with the node address, B, of this node to see if they match (step S15). In step S15, the source address, SA, and the node address, B, of this node are compared to check if the communication frame 31 received in step S11 is a communication frame which was generated by this node and which has returned to this node after circulating around the ring network 2.

If it is found, as a result of address comparison in step S15, that the source address, SA, and the address of this node do not match, that is, if it is found the communication frame 31 received in step S11 is not a communication frame which was generated by this node and which has returned after circulating around the ring network 2, the passage counter comparison unit 21 reads the passage counter count value C described in the received communication frame 31 (step S16), reads the total number of nodes D stored in the connection node count storage unit 19 as the one-round checking information (step S17), and performs passage counter comparison processing to compare the passage counter value with the total number of nodes D (step S18). In step S18, the passage counter count value C and the total number of nodes D are compared to check if the communication frame 31 received in step S11 is an abnormal frame for which some abnormal processing was performed.

If it is found, as a result of passage counter comparison in step S18, that the relation between the counter value C of the passage counter field 35 and the one-round checking information does not satisfy the one-round checking condition, that is, if it is found that the passage counter count value C is smaller than the total number of nodes D, the passage counter operation unit 23 judges that the received communication frame 31 is a normal frame and performs the predetermined operation on the passage counter count value C described in the passage counter field 35 of the communication frame 31. For example, it adds "1" to the passage counter count value C. In response, the frame control unit 27 generates the communication frame 31 whose passage counter field 35 has been changed to the passage counter count value C calculated by the passage counter operation unit 23 (step S19).

When the predetermined operation performed in step S19 is to add "1" to the passage counter count value C, the source node of the communication frame 31 generates the communication frame 31 with the initial value of the passage counter count value C set to "1" and transmits the generated communication frame 31 to the node located in the downstream. In this case, the one-round checking information is "the total number of nodes".

On the other hand, when the predetermined operation performed in step S19 is to subtract "1" from the passage counter count value C, the source node of the communication frame 31 generates the communication frame 31 with the initial value of the passage counter count value C set to "the total number of nodes" and transmits the generated communication frame 31 to the node located in the downstream. In this case, the one-round checking information is "0".

If it is found, as a result of passage counter comparison in step S18, that the relation between the counter value C of the passage counter field 35 and the one-round checking information satisfies the one-round checking condition, that is, if it is found that the passage counter count value C is equal to or larger than the total number of nodes D, the passage counter comparison unit 21 judges that the received communication frame 31 is an abnormal frame and performs abnormal signal transmission processing to transmit the abnormal frame reception signal, indicating that an abnormal frame has been received, to the node controller NC via a communication line 5. By doing so, it informs the node controller NC that the abnormal frame has been received (step S20).

If it is found, as a result of address comparison in step S15, that the source address, SA, matches the address of this node, that is, if it is found that the communication frame 31 received in step S11 was generated by this node and has returned after circulating around the ring network 2, or after informing the node controller that the abnormal frame has been received in step S20, the free token generation unit 25 performs frame generation processing, described below, to generate a free token frame (step S21).

That is, if it is found that the source address, SA, and the address of this node match as a result of address comparison in step S15, the free token generation unit 25 judges that the communication frame 31 generated by this node has returned, discards it, and performs returned-frame regeneration processing to generate a new free token frame which is a non-occupied frame. If it is found, as a result of passage counter comparison in step S18, that the relation between the count value C of the passage counter field 35 and the one-round checking information satisfies the one-round checking condition, that is, if it is found that the passage counter count value C is equal to or larger than the total number of nodes, the free token generation unit 25 judges that the received communication frame 31 is an abnormal frame, discards the received communication frame 31 and performs abnormal frame regeneration processing to generate a new free token frame which is a non-occupied frame.

As described above, when the received communication frame 31 is an abnormal frame, a new free token frame is generated and the generated new free token frame, which is a non-occupied frame, is transmitted to the node located in the downstream. Therefore, even when an abnormal condition occurred on the ring-form transmission line 3 or in any of the nodes N, an abnormal frame which is generated due to the abnormal condition and which would circulate around the ring network 2 semi-permanently if left unattended may be returned to the normal state. As a result, a highly-reliable ring network supervisory system protected against abnormal conditions may be implemented.

In this embodiment, the free token generation unit 25 generates a free token frame in step S21 when the communication frame 31 returns to its source node after a one-round circulation or when the communication frame 31 is an abnormal frame. The present invention is not limited to this specific embodiment. Instead of generating a new free token frame, the free token generation unit 25 may generate a communication frame containing data that is waiting to be transmitted if such data exist. This gives a node, which has received a frame generated by itself or an abnormal frame, a chance to transmit a communication frame containing data waiting to be transmitted in the node. Therefore, each node may get transmission rights more often, thereby increasing the throughput of the whole ring network system.

The frame transmission unit 29 performs frame transmission processing to transmit either the communication frame 31 generated by the frame control unit 27 in step S19 or a new free token frame generated by the free token generation unit 25 in step S21 to the node located in the downstream (step S22) and, after frame transmission processing in step S22, ends frame processing.

As described above, when a node in the network supervisory system according to the present invention receives a communication frame, it first references the description content of the communication frame to check if the received communication frame is an occupied frame which was issued by one of a plurality of nodes including this node or a non-occupied node which is not a frame issued from any of the plurality of nodes. If it is found, as a result of this frame checking, that the received communication frame is an occupied frame, the node compares the source address described in the received communication frame with the address of the node. If it is found, as a result of this address comparison, that the source address and the address of this node do not match, the node checks the relation between the passage counter count value described in the received communication frame and the one-round checking information. If it is found, as a result of this passage counter checking, that the relation between the passage counter count value and the one-round checking information does not satisfy the one-round checking condition, that is, if it is found that the passage counter count value is smaller than the total number of nodes, then the node judges that the received communication frame is a normal communication frame and performs the predetermined operation on the passage counter count value described in the passage counter count description area of the communication frame. If it is found that the relation between the passage counter count value and the one-round checking information satisfies the one-round checking condition, that is, if it is found that the passage counter count value is equal to or larger than the total number of nodes, then the node judges that the received communication frame is an abnormal communication frame and sends an abnormal frame reception signal indicating that the abnormal frame has been received. In addition, when the node is the source of the communication frame, the node describes the address of the node in the source address description area and generates a communication frame whose passage counter description area has been changed to the passage counter count value used as the initial value. When the node is not the source of the communication frame, the node generates a communication frame whose passage counter description area has been changed to the count value calculated through the predetermined operation. Then, the node transmits the generated communication frame to the node located in the downstream. Therefore, the present invention provides a simply-structured ring network supervisory system capable of detecting and then immediately recovering an abnormal frame which cannot be transmitted normally, even when the system is used in a ring network composed of a plurality of nodes, among which data may be exchanged with each other, connected via a ring-form transmission line which allows a communication frame to be circulated in one direction and, in addition, a plurality of communication frames to be transmitted at the same time.

It is to be understood that the present invention is not limited to the foregoing embodiment and that various changes may be made in the invention without departing from the spirit and scope of the claims.

For example, in the example shown in FIG. 3, the time interval between each two of a plurality of communication frames 31 is predetermined. The present invention is not limited to this form. For example, any interval of free time may be reserved between each two communication frames 31 or no free time may be reserved to combine a plurality of communication frames 31.

What is claimed is:

1. A ring network supervisory system supervising a communication status of a ring network to which a plurality of nodes are connected via a ring-form transmission line for exchanging data, said transmission line allowing a communication frame to be circulated in one direction and, in addition, a plurality of communication frames to be on the transmission line at the same time, said communication frame comprising:
    a source address description area in which a source address of a source node of the communication frame is described; and
    a passage counter description area in which a passage counter count value representing a passage count is described, said passage count being incremented each time the communication frame passes through each of said plurality of nodes, each of said plurality of nodes comprising:
    frame reception means for receiving said communication frame from a neighboring node located in an upstream of the node;
    local node address storage means for storing a local node address assigned uniquely to the node;
    one-round checking information storage means for storing one-round checking information referenced to check if said communication frame has circulated around said ring network;
    frame checking means for referencing a description content of the communication frame received by said frame reception means to check to see if the received communication frame is an occupied frame originated from any of said plurality of nodes or a non-occupied frame not originated from any of said plurality of nodes, said plurality of nodes including the node;
    address comparison checking means for comparing the source address described in the received communication frame with the local node address stored in the local node address storage means when said frame checking means find that said received communication frame is the occupied frame;

passage counter comparison checking means for checking a relation between the passage counter count value described in said received communication frame with the one-round checking information stored in said one-round checking storage means when the address comparison checking means find that the source address and the local node address do not match;

passage counter operation means for determining said received frame is normal and for performing a predetermined operation on the passage counter count value described in the passage counter description area in the communication frame when the passage counter comparison checking means find that the relation between said passage counter count value and said one-round checking information do not satisfy a one-round checking condition;

abnormal-frame reception signal transmission means for determining that said received communication frame is an abnormal frame and for transmitting an abnormal frame reception signal indicating that the abnormal frame has been received when said passage counter comparison means find that the relation between said passage counter count value and said one-round checking information satisfies the one-round checking condition;

frame generation control means for generating the communication frame when the node is the source of said communication frame, said source address description area describing the local node address and said passage counter description area describing the passage counter count value to be used as an initial value, and for generating the communication frame when the node is not the source of said communication frame, said passage counter count description area describing the passage counter count value calculated by said passage counter operation means; and frame transmission means for transmitting the communication frame generated by the frame generation control means to the neighboring node located in a downstream of the node.

2. The ring network supervisory system according to claim 1 wherein said frame generation control means further comprises a returned-frame regeneration function which, when said address comparison checking means finds that the source address and the local node address match, judges that the communication frame originated by the node has returned to the node, discards said received communication frame, and generates a new free token frame which is the non-occupied frame.

3. The ring network supervisory system according to claim 1 wherein said frame generation control means further comprises an abnormal frame regeneration function which, when said passage counter comparison means finds that the relation between said passage counter count value and said one-round checking information satisfies the one-round checking condition, judges that said received communication frame is the abnormal frame, discards the received communication frame, and generates a new free token frame which is the non-occupied frame.

4. The ring network supervisory system according to claim 2 wherein, when the node has data waiting to be transmitted, said frame generation control means generates the communication frame containing the data waiting to be transmitted instead of said new free token frame which is the non-occupied frame.

5. The ring network supervisory system according to claim 3 wherein, when the node has data waiting to be transmitted, said frame generation control means generates the communication frame containing the data waiting to be transmitted instead of said new free token frame which is the non-occupied frame.

6. The ring network supervisory system according to claim 1 wherein, when said frame checking means finds that said received communication frame is the non-occupied frame, said frame generation control means further comprises a new communication frame generation function which rewrites said passage counter count value of said received communication frame and generates a new communication frame.

7. The ring network supervisory system according to claim 1 wherein, when the passage counter checking indicates that the relation between said passage counter count value and said one-round checking information satisfies the one-round checking condition, the passage counter comparison checking means comprises an abnormal frame reception signal transmission function which judges that said received communication frame is the abnormal frame and transmits an abnormal frame reception signal indicating that the abnormal frame has been received.

8. The ring network supervisory system according to claim 7, further comprising:

a plurality of communication supervisory means each connected to one of said plurality of nodes and supervising the communication status of the node, wherein said passage counter comparison checking means transmits the abnormal frame reception signal indicating that said abnormal frame has been received to said communication supervisory means connected to the node to inform the communication supervisory means connected to the node that the abnormal frame has been received.

9. The ring network supervisory system according to claim 1 wherein the predetermined operation performed by said passage counter operation means is to add "1" to said passage counter count value.

10. The ring network supervisory system according to claim 1 wherein the predetermined operation performed by said passage counter operation means is to subtract "1" from said passage counter count value.

11. A ring network supervisory system supervising a communication status of a ring network to which a plurality of nodes are connected via a ring-form transmission line for exchanging data, said communication frame comprising:
  a source address description area in which a source address of a source node of the communication frame is described; and
  a passage counter description area containing a value which is updated each time said communication frame passes through each of said plurality of nodes, each of said plurality of nodes comprising:
  frame reception means for receiving said communication frame;
  address comparison means for comparing the source address described in the received communication frame with a local node address;
  one-round checking means for checking if the received communication frame has circulated around said ring network, based on a counter value stored in the passage counter description area of the received communication frame, when said address comparison means judges that the source address and the local node address do not match;

passage counter operation means for judging that the received communication frame is a normal frame and for performing a predetermined operation on the counter value stored in the passage counter description area in the received communication frame to update the counter value when said one-round checking means judges that the received communication frame has not yet made a one-round circulation;

abnormal-frame reception signal transmission means for judging that said received communication frame is an abnormal frame and for transmitting a signal indicating that the abnormal frame has been received when said one-round checking means find that the received communication frame has made the one-round circulation;

frame generation control means for generating the communication frame when the node is the source of said received communication frame, said source address description area describing the local node address and said passage counter description area describing an initial value, and for generating the communication frame when the node is not the source of said received communication frame, said passage counter description area describing the counter value updated by said passage counter operation means; and frame transmission means for transmitting the communication frame generated by the frame generation control means.

* * * * *

UNITED STATES PATENT AND TRADEMARK OFFICE
CERTIFICATE OF CORRECTION

PATENT NO.   : 6,414,941 B1
DATED        : July 2, 2002
INVENTOR(S)  : Katsumi Murakami It is certified that error appears in the above-identified patent and that said Letters Patent is hereby corrected as shown below:

Column 1,
Line 64, delete "and" (first occurrence).

Column 8,
Line 22, delete "the" (second occurrence).

Column 11,
Line 1, change "S1" to -- S11 --.

Signed and Sealed this

Fourth Day of March, 2003

*Attest:*

*Attesting Officer*

JAMES E. ROGAN
*Director of the United States Patent and Trademark Office*